(12) United States Patent
Burgess et al.

(10) Patent No.: US 10,427,036 B2
(45) Date of Patent: Oct. 1, 2019

(54) GAMES CONTROLLER

(71) Applicant: Ironburg Inventions Ltd., Wincanton, Somerset (GB)

(72) Inventors: Simon Burgess, Cossington (GB); Duncan Ironmonger, Atlanta, GA (US)

(73) Assignee: Ironburg Inventions Limited, Wincanton (GB)

( * ) Notice: Subject to any disclaimer, the term of this patent is extended or adjusted under 35 U.S.C. 154(b) by 36 days.

(21) Appl. No.: 15/264,810

(22) Filed: Sep. 14, 2016

(65) Prior Publication Data

US 2017/0087456 A1 Mar. 30, 2017

Related U.S. Application Data

(60) Provisional application No. 62/232,020, filed on Sep. 24, 2015.

(51) Int. Cl.
*A63F 13/24* (2014.01)
*A63F 13/21* (2014.01)
*A63F 13/22* (2014.01)
*A63F 13/20* (2014.01)

(52) U.S. Cl.
CPC ............ *A63F 13/24* (2014.09); *A63F 13/21* (2014.09)

(58) Field of Classification Search
CPC ............ A63F 13/24; A63F 13/21; B25J 13/02
See application file for complete search history.

(56) References Cited

U.S. PATENT DOCUMENTS 4,032,728 A 6/1977 Oelsch
4,786,768 A 11/1988 Langewis et al.
5,430,262 A 7/1995 Matsui et al.
5,451,053 A 9/1995 Garrido
5,773,769 A 6/1998 Raymond
5,841,372 A 11/1998 Matsumoto
5,874,906 A 2/1999 Willner et al.
(Continued)

FOREIGN PATENT DOCUMENTS

CN 202 528 096 U 11/2012
CN 203 077 157 U 7/2013
(Continued)

OTHER PUBLICATIONS

European Patent Office, Extended European Search Report, EP 16 18 9026 (dated Aug. 5, 2017).
(Continued)

*Primary Examiner* — David Duffy
*Assistant Examiner* — Ankit B Doshi
(74) *Attorney, Agent, or Firm* — Walters & Wasylyna LLC

(57) ABSTRACT

The invention provides an improved controller (10) for a games console. The invention is a games controller (10) that is intended to be held by a user in both hands. Additionally, the controller of the invention (10) may comprise a plurality of controls located on the front and top of the controller. The controller of the present invention (10) is advantageous as it additionally comprises at least one additional control (11A, 11B) located on the rear of the controller (10) in a position to be operated by the middle fingers of a user (12). The additional control (11A, 11B) may be a paddle lever and may replicate the function of either one of two of the controls located on the front or top of the controller (10).

33 Claims, 9 Drawing Sheets

(56) References Cited

U.S. PATENT DOCUMENTS

| | | | |
|---|---|---|---|
| 5,989,123 A | 11/1999 | Tosaki et al. | |
| 6,203,432 B1 | 3/2001 | Roberts et al. | |
| 6,251,015 B1 | 6/2001 | Caprai | |
| 6,512,511 B2 | 1/2003 | Willner et al. | |
| 6,752,719 B2 | 6/2004 | Himoto et al. | |
| 6,760,013 B2 | 7/2004 | Willner et al. | |
| 6,853,308 B1 | 2/2005 | Dustin | |
| 7,510,477 B2 | 3/2009 | Argentar | |
| 7,758,424 B2 | 7/2010 | Riggs et al. | |
| 7,859,514 B1 | 12/2010 | Park | |
| 8,641,525 B2 | 2/2014 | Burgess et al. | |
| 8,777,620 B1 | 7/2014 | Baxter | |
| 9,089,770 B2 | 7/2015 | Burgess et al. | |
| 9,804,691 B1 | 10/2017 | Strahle et al. | |
| 2001/0003713 A1 | 6/2001 | Willner et al. | |
| 2001/0025778 A1 | 10/2001 | Ono | |
| 2002/0052237 A1 | 5/2002 | Magill | |
| 2002/0128064 A1 | 9/2002 | Sobota | |
| 2003/0067111 A1 | 4/2003 | Swan | |
| 2004/0259059 A1 | 12/2004 | Aoki | |
| 2005/0083297 A1 | 4/2005 | Duncan | |
| 2005/0215321 A1 | 9/2005 | Hussaini et al. | |
| 2005/0230230 A1 | 10/2005 | Ueshima et al. | |
| 2005/0255915 A1 | 11/2005 | Riggs et al. | |
| 2005/0255918 A1 | 11/2005 | Riggs et al. | |
| 2006/0025217 A1 | 2/2006 | Hussaini et al. | |
| 2006/0116204 A1 | 6/2006 | Chen et al. | |
| 2007/0281787 A1* | 12/2007 | Numata | A63F 13/06 463/36 |
| 2008/0261695 A1 | 10/2008 | Coe | |
| 2009/0088250 A1 | 4/2009 | Carlson | |
| 2009/0258705 A1 | 10/2009 | Guinchard | |
| 2010/0073283 A1 | 3/2010 | Enright | |
| 2010/0267454 A1 | 10/2010 | Navid | |
| 2010/0304865 A1 | 12/2010 | Picunko | |
| 2011/0256930 A1 | 10/2011 | Jaouen | |
| 2011/0281649 A1 | 11/2011 | Jaouen | |
| 2012/0088582 A1 | 4/2012 | Wu et al. | |
| 2012/0142418 A1 | 6/2012 | Muramatsu | |
| 2012/0142419 A1 | 6/2012 | Muramatsu | |
| 2012/0260220 A1 | 10/2012 | Griffin | |
| 2012/0299244 A1 | 11/2012 | Rice et al. | |
| 2012/0322553 A1* | 12/2012 | Burgess | A63F 13/24 463/37 |
| 2012/0322555 A1 | 12/2012 | Burgess et al. | |
| 2013/0147610 A1 | 6/2013 | Grant et al. | |
| 2013/0150155 A1 | 6/2013 | Barney et al. | |
| 2013/0196770 A1 | 8/2013 | Barney et al. | |
| 2014/0274397 A1 | 9/2014 | Sebastian | |
| 2015/0234479 A1 | 8/2015 | Schantz et al. | |
| 2015/0238855 A1* | 8/2015 | Uy | A63F 13/24 463/37 |
| 2016/0082349 A1 | 3/2016 | Burgess et al. | |
| 2016/0193529 A1 | 7/2016 | Burgess et al. | |
| 2016/0346682 A1 | 12/2016 | Burgess et al. | |
| 2017/0001107 A1 | 1/2017 | Burgess et al. | |
| 2017/0001108 A1 | 1/2017 | Burgess et al. | |
| 2017/0087456 A1 | 3/2017 | Burgess et al. | |
| 2017/0151494 A1 | 6/2017 | Ironmonger et al. | |
| 2017/0157509 A1 | 6/2017 | Burgess et al. | |

FOREIGN PATENT DOCUMENTS

| | | |
|---|---|---|
| EP | 1 208 883 | 5/2002 |
| EP | 1852162 | 11/2007 |
| EP | 2 479 636 | 7/2012 |
| EP | 2 440 438 | 4/2013 |
| EP | 2 698 185 | 2/2015 |
| GB | 2 244 546 | 12/1991 |
| GB | 2 481 633 | 1/2012 |
| JP | H1020951 | 1/1998 |
| JP | 2001 084077 | 3/2001 |
| WO | WO 02/34345 | 5/2002 |
| WO | WO 03/046822 | 6/2003 |
| WO | WO 2008/131249 | 10/2008 |
| WO | WO 2012/036710 | 3/2012 |
| WO | WO 2014/187923 | 11/2014 |
| WO | WO2015/004261 | 1/2015 |
| WO | WO2015/110553 | 7/2015 |

OTHER PUBLICATIONS

International Search Report, PCT/EP2015/052448 (dated 2015).
International Search Report, PCT/EP2015/051290 (dated 2015).
International Search Report, PCT/EP2014/075851 (dated 2015).
International Search Report, PCT/EP2014/075861 (dated 2015).
International Search Report, PCT/EP2014/060587 (dated 2014).
International Search Report, PCT/EP2015/058096 (dated 2015).
Written Opinion of the International Searching Authority, PCT/EP2015/058096 (dated 2015).
Burns, "Review: Scuf Xbox 360 Controller," Xboxer360.com (2010).
Combined Search and Examination Report, GB1011078.1 (dated 2011).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Office Action, U.S. Appl. No. 14/832,211 (dated 2015).
Office Action, U.S. Appl. No. 14/736,771 (dated 2015).
Office Action, U.S. Appl. No. 14/805,597 (dated 2015).
Office Action, U.S. Appl. No. 14/805,641 (dated 2015).
Corrected Petition for Inter Partes Review of U.S. Pat. No. 9,089,770, Under 37 C.F.R. § 42.100, filed by Valve Corporation, Case IPR2016-00949 (2016).
Corrected Petition for Inter Partes Review of U.S. Pat. No. 8,641,525, Under 37 C.F.R. § 42.100, filed by Valve Corporation, Case IPR2016-00948 (2016).
Xbox 360 Wireless Controller Tour, published on May 13, 2005 at http://www.ign.com/articles/2005/05/13/xbox-360-wireless-controller-tour.

* cited by examiner

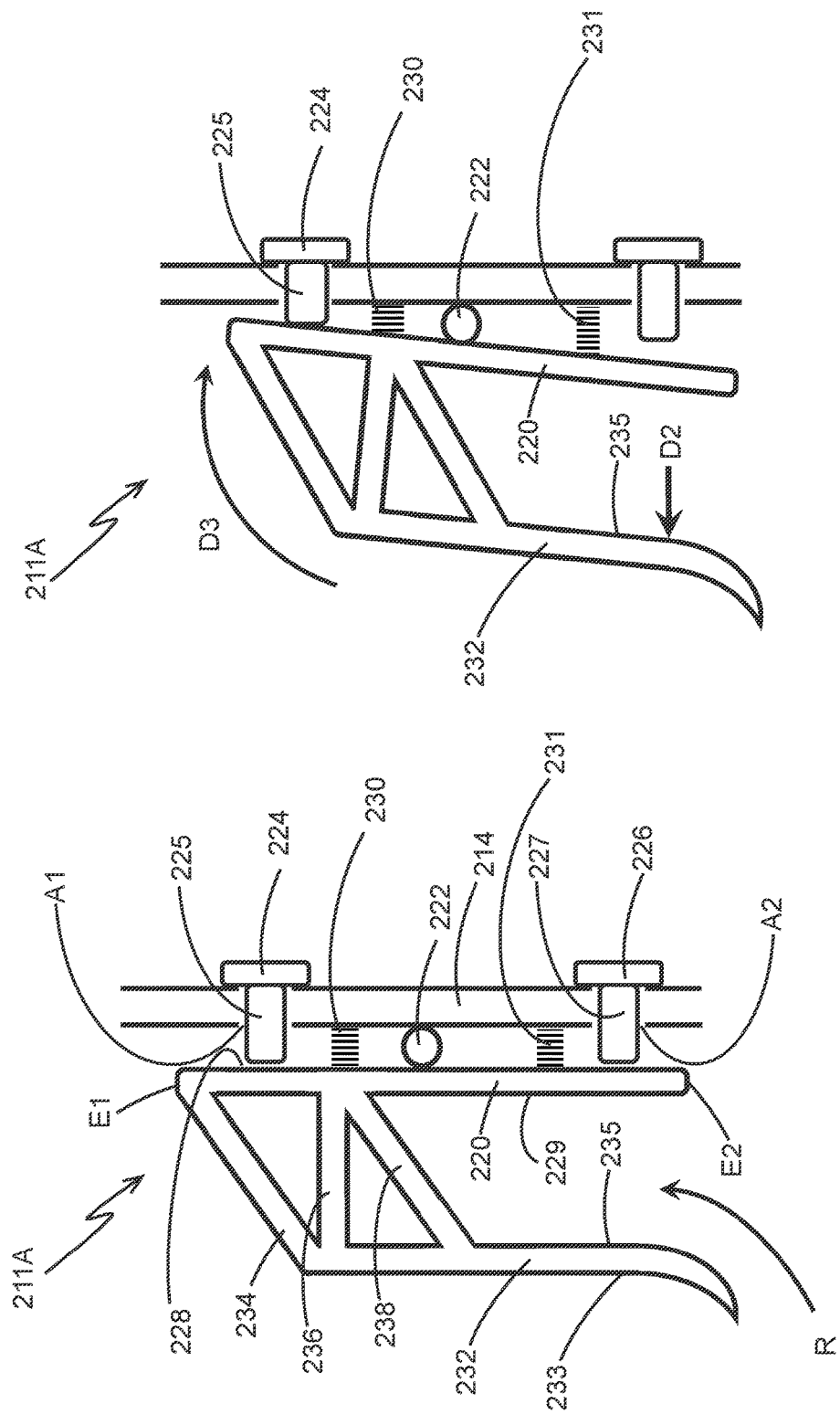

GAMES CONTROLLER

PRIORITY

This is a non-provisional of, and claims priority from, U.S. Ser. No. 62/232,020 filed on Sep. 24, 2015, the entire contents of which are incorporated herein by reference.

FIELD

The invention relates to controllers for controlling the play of computerised games; more particularly, but not exclusively, the invention relates to an actuator system of a game controller for a gaming console.

BACKGROUND

There are many different types of gaming consoles currently available for operating a video game. For example, Microsoft®, Sony® and Nintendo® manufacture the Xbox®, Playstation® and Wii® gaming consoles, respectively. The gaming consoles typically include a game controller so that a user can control the operation of the video game.

Controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers.

Some known game controllers include a form of actuator system for the operation of control of the functions of the video games. Actuators, buttons or other depressible or manually operable devices are typically used for controlling discrete actions such as the firing of a weapon or issuing an attack command. It is known to provide a button, actuator, or other controls, on the front and top of the controller. Controls mounted on the top of the controller are intended to be operable by the index fingers of a user; such buttons are commonly known as triggers or bumpers. Controls mounted on the front of the controller are intended to be operable by the thumbs of a user; such controls may include left and right analogue thumb sticks, which normally control movement and are intended to be operated by the user's left and right thumbs respectively. There may be additional buttons located on a forward right portion of the front of the controller, which normally control additional actions and are intended to be operated by the user's right thumb. There may be provided a direction pad located on the rearward left portion of the front of the controller. The direction pad is intended to be operated by the user's left thumb, typically either as an alternative to the left thumb stick or to provide additional actions. The controllers typically have a pair of handles or grip portions to enable a user to hold the controller; typically the user will employ the middle, ring and/or little finger of each hand to grasp a respective handle.

Due to the rapidly expanding gaming market and development of involved games invoking considerable player input, it is desirable for players to be able to customise their controllers in order to gain increased control in a variety of gaming circumstances.

The present invention seeks to improve upon, or at least mitigate, some of the problems associated with controllers of the prior art by providing a game controller which includes additional actuators on the bottom of the controller, which allow a user to employ the middle, ring or little finger of the hand for operation of control of the functions of a video game.

SUMMARY

A first aspect of the present invention provides an apparatus for supplying user inputs to a computer program, such as a game program, for controlling the game program, comprising:

a case; and a plurality of controls located on a front and top of the apparatus;

the apparatus being shaped to be held in both hands of a user such that the user's thumbs are positioned to operate controls located on the front of the apparatus and the user's index fingers are positioned to operate controls located on the top of the apparatus; wherein the apparatus further comprises at least one first additional control located on a back of the apparatus in a position operable by a middle, ring or little finger of a user, the at least one additional control comprising at least one actuator disposed in overlying relationship with a first switch mechanism and a second switch mechanism, the actuator being pivotally coupled to the apparatus such that the actuator activates the first switch when rotated in a first direction and activates the second switch when rotated in a second opposing direction.

Optionally, the actuator is resiliently biased to return to a neutral position in which neither of the first and second switch mechanisms are activated.

Optionally, the actuator is removably mounted to the apparatus.

Optionally, the actuator comprises a first part of a complementary securing mechanism and the case comprises a second part of a complementary securing mechanism wherein the first part mates with second part to secure the actuator to the case.

Optionally, the first part of a complementary securing mechanism toollessly mates with the second part of a complementary securing mechanism.

Optionally, the actuator comprises a void for receiving at least one finger of a user, the void being defined in part by a first wall and in part by a second opposing wall, the first wall forming a first engaging surface for rotational movement of the actuator in a first direction and the second wall forming a second engaging surface for rotational movement of the actuator in a second opposing direction.

Optionally, the void is open at one end such that a user may insert a finger through said open end.

Optionally, the void extends across opposing sides of a fulcrum.

Optionally, the void is arranged such that each of the first and second switches can be activated by engaging with the first wall on opposing sides of the fulcrum.

Optionally, the void is arranged such that each of the first and second switches can be activated by engaging with the second wall on opposing sides of the fulcrum.

Optionally, the first and second switch mechanisms are co-linear.

Optionally, the first and second switch mechanisms are coupled to the case at a position offset from a notional line defined by the first and second switch mechanisms.

Optionally, the first and second switch mechanisms are coupled to the case at a position inset from a notional line defined by the first and second switch mechanisms.

A second aspect of the present invention provides an apparatus for supplying user inputs to a computer program, such as a game program, for controlling the game program, comprising:

a case; and a plurality of controls located on a front and top of the apparatus;

the apparatus being shaped to be held in both hands of a user such that the user's thumbs are positioned to operate controls located on the front of the apparatus and the user's index fingers are positioned to operate controls located on the top of the apparatus; wherein the apparatus further comprises at least one first additional control located on a back of the apparatus in a position operable by a middle, ring or little finger of a user, the at least one additional control comprising at least one actuator disposed in overlying relationship with a first switch mechanism and a second switch mechanism, the actuator being mounted to the apparatus by a support and being elastically deformable so as to activate at least one of the first and second switches.

Optionally, the actuator is removably mounted to the apparatus.

Optionally, the actuator comprises a first part of a complementary securing mechanism and the case comprises a second part of a complementary securing mechanism wherein the first part mates with second part to secure the actuator to the case.

Optionally, the first part of a complementary securing mechanism toollessly mates with the second part of a complementary securing mechanism.

Optionally, the actuator comprises a void for receiving at least one finger of a user, the void being defined in part by a first wall and in part by a second opposing wall, the first wall forming a first engaging surface for displacement of the actuator by application of a force towards the case and the second wall forming a second engaging surface for displacement of the actuator by application of a force away from the case.

Optionally, the void is open at one end such that a user may insert a finger through said open end.

Optionally, the first and second switch mechanisms are co-linear.

Optionally, the first and second switch mechanisms are coupled to the case at a position offset from a notional line defined by the first and second switch mechanisms.

Optionally, the first and second switch mechanisms are coupled to the case at a position inset from a notional line defined by the first and second switch mechanisms.

A third aspect of the present invention provides an apparatus for supplying user inputs to a computer program, such as a game program, for controlling the game program, comprising:

a case; and a plurality of controls located on a front and top of the apparatus;

the apparatus being shaped to be held in both hands of a user such that the user's thumbs are positioned to operate controls located on the front of the apparatus and the user's index fingers are positioned to operate controls located on the top of the apparatus; wherein the apparatus further comprises at least one first additional control located on a back of the apparatus in a position operable by a middle, ring or little finger of a user, the at least one additional control comprising at least one actuator disposed in overlying relationship with at least one sensor, the actuator being pivotally coupled to the apparatus such that the actuator activates the at least one sensor when rotated in a first direction and activates the at least one sensor when rotated in a second opposing direction.

In some embodiments the apparatus is a games controller. Further features and advantages of the present invention will be apparent from the specific embodiment illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 6A is a partial sectional view of an actuator of the controller of FIG. 5 in a neutral position;

FIG. 6B is a partial sectional view of the actuator of FIG. 6A in a second activated position;

DETAILED DESCRIPTION

Detailed descriptions of specific embodiments of game controllers and actuators are disclosed herein. It will be understood that the disclosed embodiments are merely examples of the way in which certain aspects of the invention can be implemented and do not represent an exhaustive list of all of the ways the invention may be embodied. Indeed, it will be understood that the game controllers and actuators described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
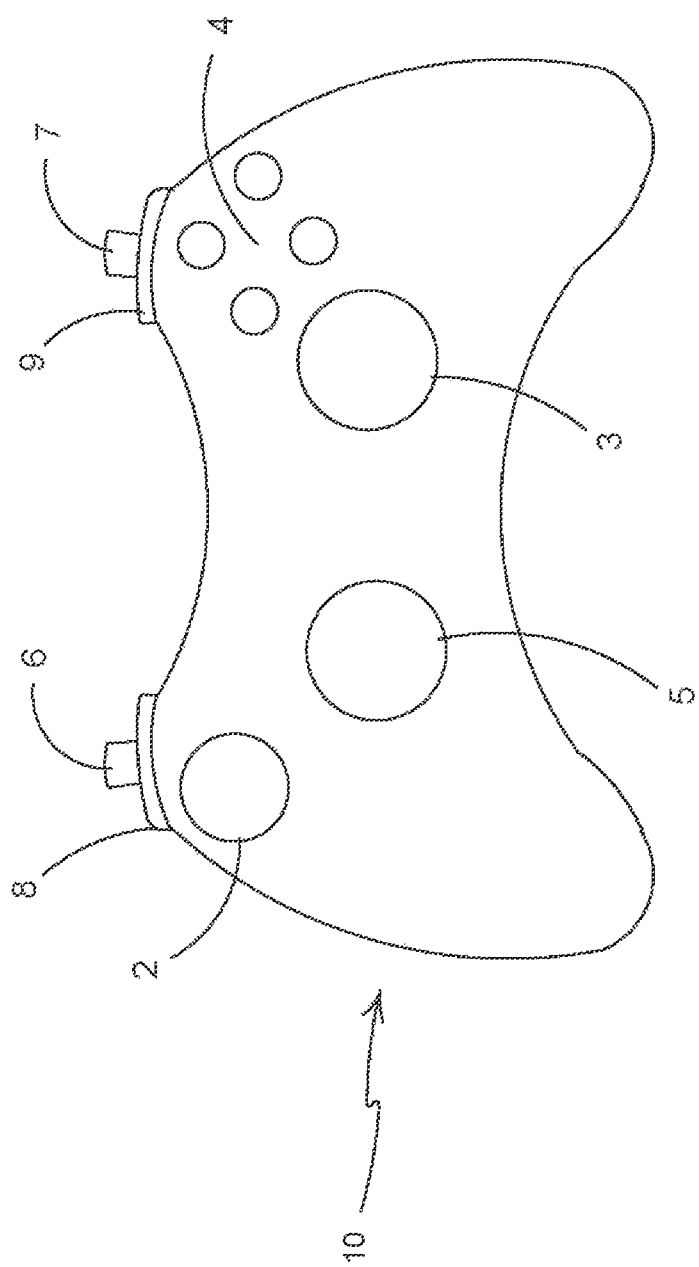
FIG. 1 is a schematic illustration of the front of a games console controller according to one embodiment.

Referring to FIG. 1, there is shown a controller 10 according to an embodiment of the invention. The controller 10 comprises an arrangement of game controls that are mounted on the front and top of the controller 10. The controller 10 comprises a left analogue thumb stick 2 and a right analogue thumb stick 3 mounted on the front of the controller 10. The left analogue thumb stick 2 and the right analogue thumb stick 3 normally control movement actions and are intended to be operated by the user's left and right thumbs respectively. The controller 10 comprises four buttons 4, located on a forward right portion of the front of the controller 10, which normally control additional in-game actions and that are intended to be operated by the user's right thumb. The controller 10 comprises a direction pad 5 located on the rearward left portion of the front of the controller 10. The direction pad 5 is intended to be operated by the user's left thumb, and typically is used either as an alternative to the left thumb stick 2, or to provide additional actions. The controller 10 also comprises a left trigger body 6, a right trigger body 7, a left bumper 8 and a right bumper 9 located on the top of the controller 10. The left and right trigger bodies 6, 7 are typically operated by a user's index fingers or forefingers. The left and right bumpers 8, 9 may also be operated by a user's index fingers or forefingers. It will be understood that the arrangement of game controls illustrated in respect of the present embodiment is optional and may vary in other game controllers embodying the present invention, which may be applied to a variety of actuators as described below.

Figure 2:
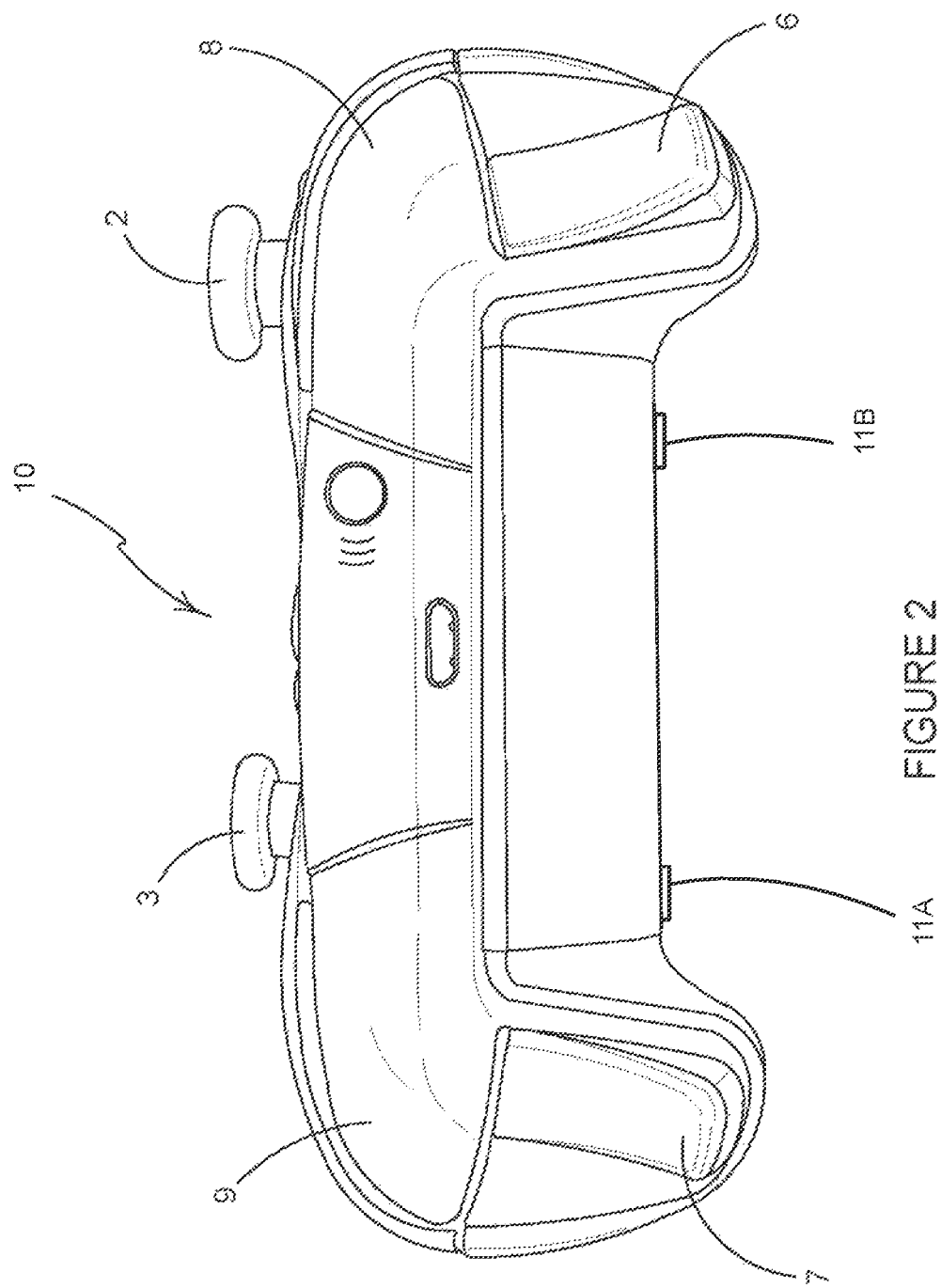
FIG. 2 is a top view of the games console controller of FIG. 1.

FIG. 2 illustrates a top view of the controller 10 of FIG. 1. It can be seen that the left trigger body 6 is mounted below the left bumper 8 and the right trigger body 7 is mounted below the right bumper 9.

A user may operate the four buttons 4 on the front of the controller by removing their right thumb from the right thumb stick 3 and placing their right thumb upon one or more of the four buttons 4. This operation takes time and, in some games, can cause a loss of control. This is a particular problem in applications requiring precision, for example combat games, where the right thumb stick 3 is used for aiming a weapons cross-hair or other reticle. A similar problem may arise in games where the direction pad 5 provides additional actions and the user is required to remove their left thumb from the left thumb stick 2 in order to operate the direction pad 5.

In light of the above, there is a need for an improved controller which removes the requirement for a user to remove their thumbs from the left or right thumb sticks 2, 3 in order to operate additional actions controlled by the four buttons 4 and/or the direction pad 5.

Figure 3:
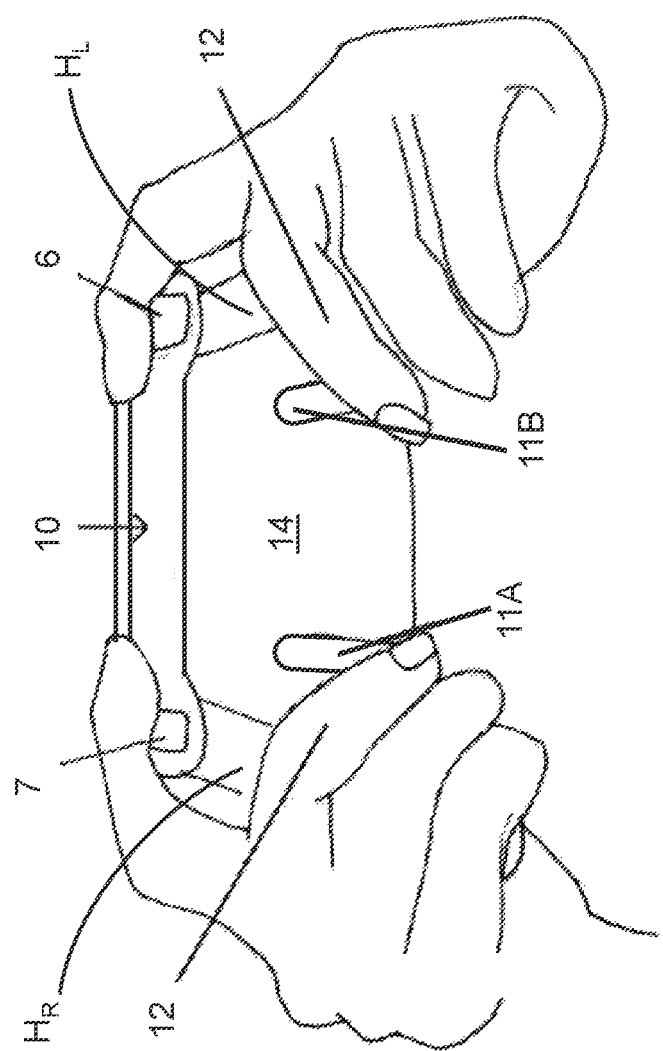
FIG. 3 is a schematic illustration from below of the rear panel of the games controller of FIG. 1 showing a user's hands.

The rear of the games controller 10 is illustrated in FIG. 3. The controller 10 comprises a first handle $H_R$ and a second handle $H_L$. The first handle $H_R$ and the second handle $H_L$ are disposed on opposing lateral sides of a central body portion 14. The first handle $H_R$ is intended to be grasped in the right hand R of a user 12. The second handle $H_L$ is intended to be grasped in the left hand L of a user 12. The user 12 wraps one or more of the middle, ring and little fingers of the right hand R about the first handle $H_R$. The user wraps one or more of the middle, ring and little fingers of the left hand L about the second handle $H_L$.

The controller 10 comprises two actuators in the form of paddle levers 11A, 11B, a first paddle lever 11A and a second paddle lever 11B, mounted on the rear of the controller 10. The paddle levers 11A, 11B are positioned to be operated by the middle, ring or little fingers of a user 12, as shown in FIG. 3.

A user may displace or depress either of the paddle levers 11A, 11B by engaging an outer surface thereof; such displacement causes the actuated paddle 11A, 11B to activate one of a pair of switch mechanisms 24, 26 (see FIG. 4A).

The first and second paddle levers 11A, 11B are substantially the same in construction and will be described with reference to the first paddle lever 11A illustrated in FIG. 4A. The first paddle lever 11A is displaceable about a coupling mounted to the controller body portion 14. The first paddle lever 11A is pivotally mounted to the controller body portion 14. The first paddle lever 11A pivots or rotates about a fulcrum at a position indicated by reference 22. In alternative embodiments the paddle lever may be deformed or bent about a support disposed at a position indicated by reference 22. The support or fulcrum is located between the first end E1 and the second end E2 of the first paddle lever 11A. Optionally, the support or fulcrum is centrally located, that is to say half way between the first and second ends E1, E2. Optionally, the support or fulcrum is centrally located, that is to say half way between the first and second ends E1, E2. A first switch mechanism 24 is mounted in vertical registry with a first end portion of the first paddle lever 11A. A second switch mechanism 26 is mounted in vertical registry with a second end portion of the first paddle lever 11A. The first and second switch mechanisms 24, 26 are mounted within the body of the controller 10. A portion 25, 27 of the switch mechanism 24, 26 may extend at least partially through the controller body portion 14 and be disposed in close proximity to, or in contact with, an outermost surface of controller body portion 14. In the embodiment of FIG. 4A the switch mechanisms 24, 26 are arranged such that the portions 25, 27 of the switch mechanisms 24, 26 extend through respective ones of apertures A1, A2 in the controller body portion 14 so as to be flush with an outer surface of the controller body portion 14. In other embodiments the portions 25, 27 of the switch mechanisms 24, 26 extend through the controller body portion 14 and may be offset with respect to the outer surface of the controller body portion 14 so as to be recessed within the controller body portion 14, yet still disposed within the bore defined by apertures A1, A2 in the controller body portion 14.

The paddle lever 11A is arranged such that an inner surface of the paddle lever 11A is disposed in close proximity (optionally in touching contact) to each of the portions 25, 27 of the first and second switch mechanisms 24, 26 when in a neutral or rest position indicated by dashed lines P.

In some embodiments the switch mechanism may be a magnetic or optical sensor rather than mechanical, such as a tact switch. The paddle lever 11A may comprise a magnetic or other suitable device to activate the sensor.

In some embodiments the apertures may be omitted; the switch (or sensor) may be mounted to a surface optionally an inner surface of the controller body portion 14. Each switch senses movement of the paddle lever 11A towards the controller body portion 14 to initiate a control function of the controller. In some embodiments the sensor may be capable of determining the direction of movement of the paddle lever 11A towards and away from the controller body portion 14. In such embodiments where the sensor can determine the direction of movement, a single sensor need only be provided to initiate two separate control functions.

The first paddle lever 11A comprises a first protuberance or boss 21 and a second protuberance or boss 23 extending from a first, inner surface 28 of the first paddle lever 11A. The first boss 21 is disposed proximate the first end E1 of the first paddle lever 11a. The first boss 21 is arranged so as to engage with the first switch mechanism 24 when the first paddle lever 11A is depressed proximate the first end E1 of the first paddle lever 11A.

The second boss 23 is disposed proximate the second end E2 of the first paddle lever 11a and is arranged so as to engage with the second switch mechanism 26 when the first paddle lever 11A is depressed proximate the second end E2 of the first paddle lever 11A, as shown in FIG. 4A, a force (as indicated by direction arrow D1) applied to an second, outer, surface 29 of the first paddle lever 11A causes the first paddle lever 11A to move to an activated position P1.

Figure 4:
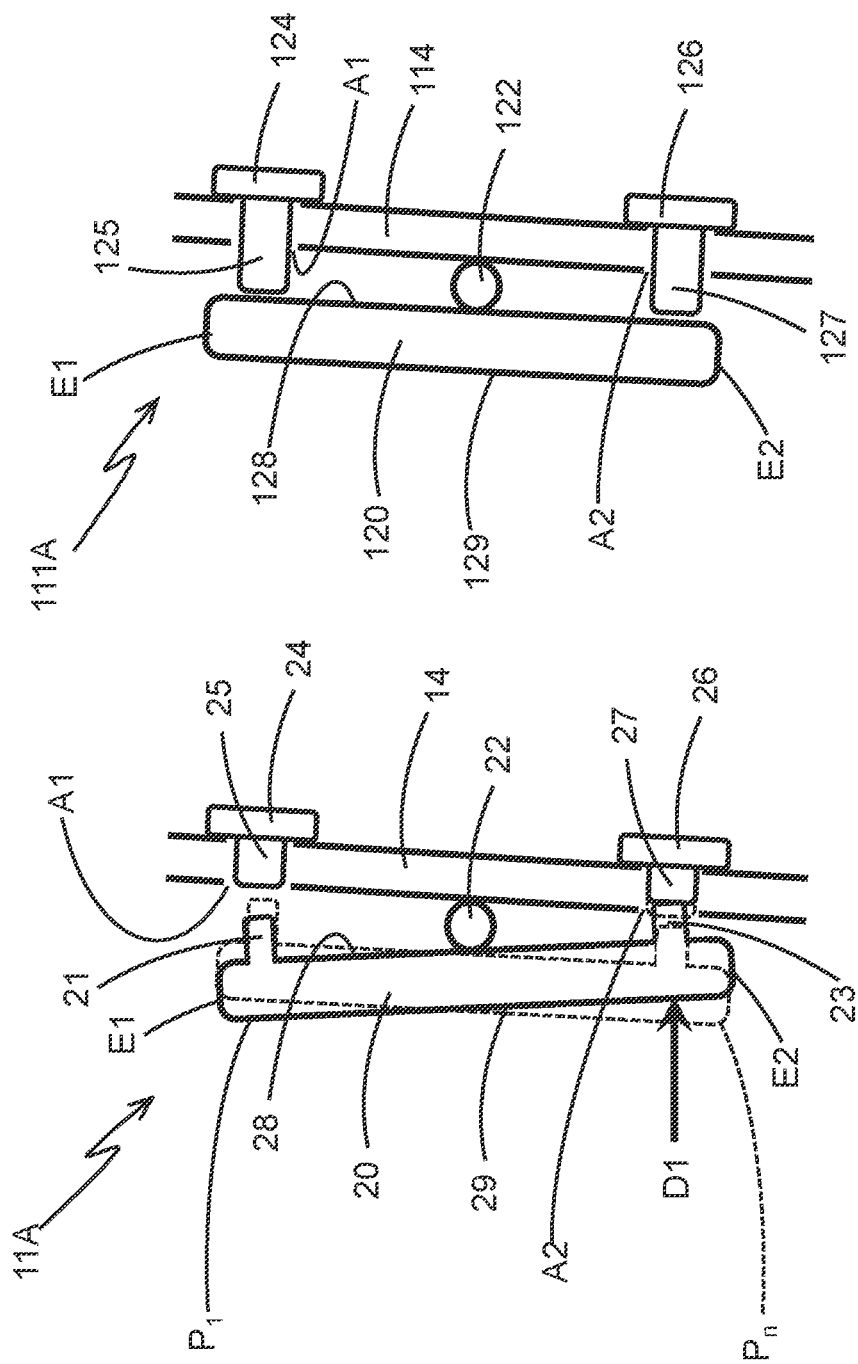
FIG. 4A is a partial sectional view of an actuator of the controller of FIG. 3 in which the actuator is in a first activated position.
FIG. 4B is a partial sectional view of an alternative actuator according to another embodiment for use with the controller of FIG. 1.

Referring now to FIG. 4B, there is shown an additional embodiment of the present disclosure. In the second illustrated embodiment like numerals have, where possible, been used to denote like parts, albeit with the addition of the prefix "100" to indicate that these features belong to the second embodiment. The additional embodiment shares many common features with the first embodiment and therefore only the differences from the embodiment illustrated in FIGS. 1 to 4A will be described in detail.

The paddle lever 111A is pivotally mounted to the controller body portion 114. The paddle lever 111A pivots or rotates about a fulcrum at a position indicated by reference 122. In alternative embodiments the paddle lever 111A may be deformed or bent about a support disposed at a position indicated by reference 122. The support or fulcrum is located between the first end E1 and second end E2 of the paddle lever 111A. Optionally, the support or fulcrum is centrally located, that is to say half way between the first and second ends E1, E2. A first switch mechanism 124 is mounted in vertical registry with a first end portion E1 of the paddle lever 111A. A second switch mechanism 126 is mounted in vertical registry with a second end portion E2 of the paddle lever 111A. The first and second switch mechanisms 124, 126 are mounted within the body of the controller 10. A respective portion 125, 127 of the first and second switch mechanisms 124, 126 may extend at least partially through respective ones of apertures A1, A2 in the controller body portion 114 and be disposed in close proximity to, or in contact with, an outermost surface of controller body portion 114. In the embodiment of FIG. 4B the switch mechanisms 124, 126 are arranged such that the portions 125, 127 of the switch mechanisms 124, 126 extend through the controller body portion 114 so as to protrude through the outer surface of the controller body portion 114. The paddle lever 111A is arranged such that an inner surface of the paddle lever 111A is disposed in close proximity (optionally in touching contact) to each of the portions 125, 127 of the first and second switch mechanisms 124, 126 when in a neutral or rest position as illustrated in FIG. 4B. In this way actuation of the paddle lever 111A is immediately or rapidly brought to bear against one of the first and second switch mechanisms 124, 126 when pressed by a user; this eliminates or minimises dead travel of the paddle lever 111A, that is to say it reduces the amount of movement of the paddle lever 111A that is necessary before it acts upon the switch mechanisms 124, 126.

In one embodiment the paddle levers 11A, 11B; 111A, 111B may be formed from a plastics material, for example polyethylene or metallic material. Preferably, the paddle levers 11A, 11B; 111A, 111B are less than 10 mm thick, but may be less than 5 mm thick.

The paddle levers 11A, 11B; 111A, 111B may be configured so as to be resiliently biased to return to a neutral position.

The paddle levers 11A, 11B; 111A, 111B may be inherently resilient, that is to say the paddle levers are elastically deformable so as to return to an unbiased position when not under load. The paddle levers 11A, 11B; 111A, 111B may be substantially rigid and may be biased by one or more spring mechanisms to return to a neutral position when not under load. In some embodiments a spring mechanism may be incorporated into the switch mechanisms.

The paddle levers 11A, 11B; 111A, 111B are mounted between the first handle portion H1 and the second handle portion H2 located on the base of the controller 10, and are disposed in close proximity to the outer surface of the controller body 14, 114.

It is envisaged that the paddle levers 11A, 11B; 111A, 111B could be retro-fitted to an existing controller 10. In such embodiments, the paddle levers 11A, 11B; 111A, 111B would be mounted to an outer surface of the controller body.

In this way, a user may engage the paddle levers 11A, 11B; 111A, 111B with the tips of the fingers, preferably the middle fingers, without compromising the user's grip on the controller 10. However, it is envisaged that a user could use the ring or little finger. The index fingers may simultaneously engage trigger style controls mounted on the top end of the controller 10 whilst the thumbs may be used to activate controls on the front of the controller 10.

The paddles 11A, 11B; 111A, 111B may be elongate in shape and may oriented in a substantially longitudinal direction, that is to say a direction which extends from the top to the bottom of the controller 10. In other embodiments the paddles 11A, 11B; 111A, 111B may be oriented in an alternative direction for example, but not limited to, a substantially transverse direction, which extends between opposed side edges of the controller 10. In one embodiment, the pair of paddles 11A, 11B; 111A, 111B is oriented such that they converge towards the forward end with respect to each other. In an alternative embodiment, the paddles 11A, 11B; 111A, 111B may be oriented parallel with respect to one another. The elongate shape of the paddles allows a user to engage the paddles with any of the middle, ring or little fingers; it also provides that different users, having differently sized hands, can engage with the paddles in a comfortable position.

Each of the paddle levers 11A, 11B; 111A, 111B can replicate the function of two of the four buttons 4 located on the front of the controller 10, and thereby allow a user 12 to operate the functions of the relevant buttons using their middle fingers without the need to remove either of their thumbs from the left or right thumb sticks 2, 3. In alternative embodiments, the paddle levers 11A, 11B; 111A, 111B may activate a new function not activated by the controls on the front of the controller 10.

Optionally, the paddle levers 11A, 11B; 111A, 111B may comprise an axe head or oar shape at each end so as to provide a larger area for engagement by a user. The paddle levers 11A, 11B; 111A, 111B may comprise a textured outer surface for example, but not limited to, a plurality of ribs, knobs or other raised embossments.

In this way a user can sense or perceive by touch—from the shape and/or texture—the optimum location to engage with the paddle levers 11A, 11B; 111A, 111B for actuation so as to activate a respective one of the switch mechanisms 24, 26; 124, 126.

In the embodiments shown in FIGS. 4A and 4B a user can actuate both switch mechanisms 124, 126 with a single finger or with two fingers.

The user 12 may place a first finger on a first side of the fulcrum 22; 122 and a second finger on a second opposing side of the fulcrum 22; 122.

Alternatively, the user 12 may employ a single finger and adjust the position at which their finger engages the paddle lever 111A with respect to the fulcrum in order to actuate both switch mechanisms 224, 226; this may be effected by sliding the finger along the paddle lever 11A; 111A.

Figure 5:
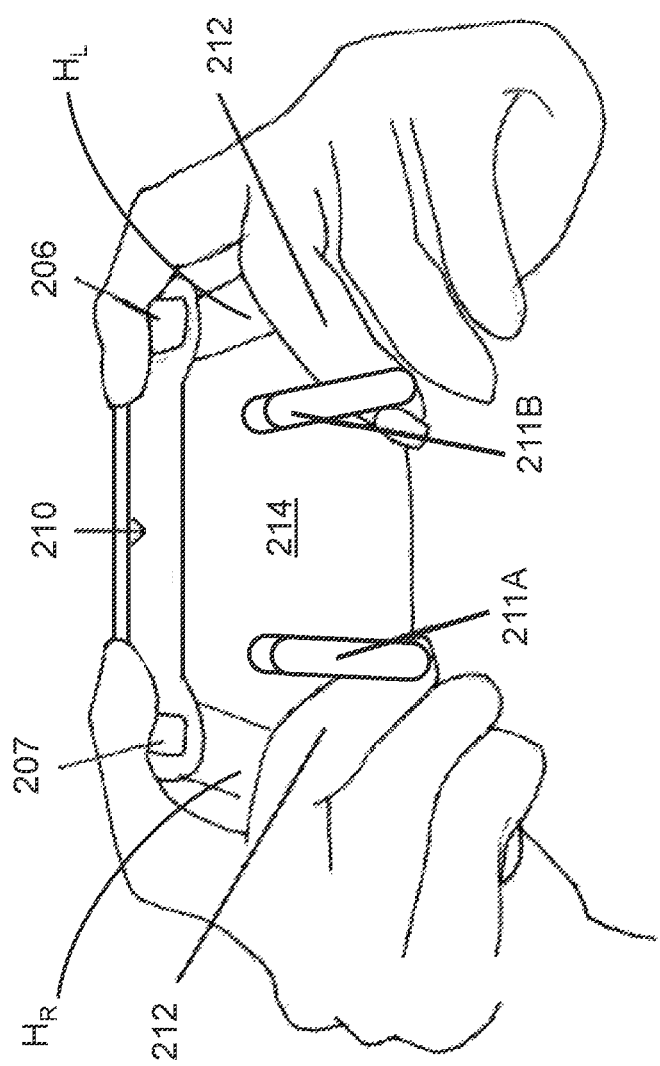
FIG. 5 is a schematic illustration from below of the rear panel of a games controller according to yet another embodiment.

Referring now to FIGS. 5 to 6B, there is shown an alternative embodiment. In the third illustrated embodiment like numerals have, where possible, been used to denote like parts, albeit with the addition of the prefix "200" to indicate that these features belong to the third embodiment respectively. The alternative embodiment shares many common features with the first and second embodiments and therefore only the differences from the embodiment illustrated in FIGS. 1 to 4B will be described in any greater detail.

The controller 210 comprises an arrangement of game controls that are mounted on the front and top of the controller 210 as described above in relation to FIG. 1.

The rear of the games controller 210 is illustrated in FIG. 5. The controller 210 comprises two paddle levers 211A, 211B, located on the rear of the controller.

The paddles 211A, 211B are mounted between a first handle portion H1 and a second handle portion H2 located on the base of the controller 210.

The first and second paddle levers 211A, 211B are substantially the same in construction and will be described with reference to the first paddle lever 211A, illustrated in FIGS. 6A and 6B. The first paddle lever 211A is pivotally mounted to the controller body portion 214. The first paddle lever 211A pivots or rotates about a fulcrum at a position indicated by reference 222. The fulcrum is located between the first end E1 and the second end E2 of the first paddle lever 211A. Optionally, the fulcrum is centrally located, that is to say half way between the first and second ends E1, E2. A first switch mechanism 224 is mounted in vertical registry with a portion of the first paddle lever 211A disposed proximate the first end E1. A second switch mechanism 226 is mounted in vertical registry with a portion of the first paddle lever 211A disposed proximate the second end E2. The first and second switch mechanisms 224, 226 are mounted within the body of the controller 210. In the embodiment of FIGS. 6A and 6B the switch mechanisms 224, 226 are arranged such that a portion 225, 227 of the switch mechanism 224, 226 passes through a respective aperture A1, A2 in the controller body portion 214 and protrudes from an outer surface of the controller body portion 214.

The first paddle lever 211A comprises a first limb 220 and a second limb 232. The second limb 232 is coupled or mounted to the first limb 220 by a support structure. The support structure comprises one or more arms 234, 236, 238. A first arm 234 extends between the first limb 220 and the second limb 232 so as to space the second limb 232 apart from the first limb 220. An optional second arm 236 extends between the first limb 220 and the second limb 232 and braces the second limb 232 apart from the first limb 220. An optional third arm 238 extends between the first limb 220 and the second limb 232 and braces the second limb 232 apart from the first limb 220.

The first limb 220, second limb 232 and the support structure are arranged so as to define a gap or void R. The void R is provided between the first limb 220 and the second limb 232 and is disposed proximate the second end E2. Optionally, the void R comprises an opening at the second end E2 such that a user may slide a finger through the opening between the first and second limbs 220, 232.

The first limb 220 defines a first wall of the void R and the second limb 232 defines a second wall of the void R; the second wall opposes the first wall.

The first paddle lever 211A comprises a resilient biasing device for returning the paddle lever 211A to the rest position shown in FIG. 6A. Optionally, the resilient biasing device takes the form of one or more springs 230, 231 disposed between an inner surface of the first limb 220 and an outer surface of the body portion 214. A first spring 230 is located in a position between the fulcrum 222 and the first end E1. A second spring 231 is located a position between the fulcrum 222 and the second end E2.

Optionally, the first and second springs 230, 231 are arranged to be in an unbiased condition when the paddle lever 211A is in the rest position.

Alternatively, the first and second springs 230, 231 are each arranged to be in a biased condition when the paddle lever 211A is in the rest position; the bias of the first spring 230 is in equilibrium with the bias of the second spring 231. The first and second springs 230, 231 each apply a force to the paddle lever 211A. The force applied to the paddle lever 211A by the first spring 230 is opposite in direction to that applied by the second spring 231. The force applied to the paddle lever 211A by the first spring 230 is in balance with the force applied by the second spring 231. In some embodiments, first and second springs 230, 231 are disposed equidistant from the fulcrum and the second spring 231 applies a force to the paddle lever 211A of equal magnitude to that of the first spring 230 and opposite in direction. In other embodiments, first and second springs 230, 231 apply forces of unequal magnitude to the paddle lever 211A; the bias applied to the paddle lever 211A may be balanced by adjusting the position of each spring relative to the fulcrum.

The first paddle lever 211A can be actuated to activate the first switch mechanism 224 by applying a force to an inner surface 235 of the second limb 232 as indicated by direction arrow D2 in FIG. 6B. The force, when applied at a location between the fulcrum and the second end E2 of the paddle lever 211A, effects a rotational movement of the paddle lever 211A such that it pivots in a clockwise direction (as indicated by direction arrow D3 in FIG. 6B) about the fulcrum 222. In this way the inner surface 228 of the first limb 220 is brought to bear against a portion 225 of the first switch mechanism 224. The force may be applied by placing a finger, such as the middle finger, in the void R. The user can apply the force by moving the finger inserted into the void R in a direction substantially away from the body portion 214 of the controller; this may be achieved by attempting to straighten said finger.

The clockwise rotational movement of the paddle lever 211A causes the second spring 231 to be stretched or placed under tension and/or the first spring 230 to be compressed. When the user 12 removes the force from the paddle lever 211A, one or both of the first and second springs 230, 231 acts upon the paddle lever 211A to return the paddle lever 211A to the rest position shown in FIG. 6A.

The first paddle lever 211A can be actuated to activate the second switch mechanism 226 by applying a force to an outer surface 229 of the first limb 220. The force, when applied at a location between the fulcrum and the second end E2 of the paddle lever 211A, effects a rotational movement of the paddle lever 211A such that it pivots in a counter-clockwise direction about the fulcrum 222. In this way the inner surface 228 of the first limb 220 is brought to bear against a portion 227 of the second switch mechanism 226. The force may be applied by placing a finger, such as the middle finger, in the void R. The user can apply the force by moving the finger inserted into the void in a direction substantially toward the body portion 214 of the controller; this may be achieved by attempting to bend said finger or tighten said finger about the controller 210.

Counter-clockwise rotational movement of the paddle lever 211A causes the first spring 230 to be stretched or placed under tension and/or the second spring 231 to be compressed. When the user removes the force from the paddle lever 211A one or both of the first and second springs 230, 231 acts upon the paddle lever 211A to return the paddle lever 211A to the rest position shown in FIG. 6A.

In the embodiment shown in FIG. 6A a user can actuate both switch mechanisms 224, 226 with a single finger. The user does not need to adjust the position of their finger on the paddle lever 211A with respect to the fulcrum in order to actuate both switch mechanisms 224, 226.

It will be appreciated that a user may employ the outer surface 233 of the second limb 232 to actuate the paddle lever 211A in a similar fashion to that described above in relation to the embodiments of FIGS. 4A and 4B.

Figure 7B:
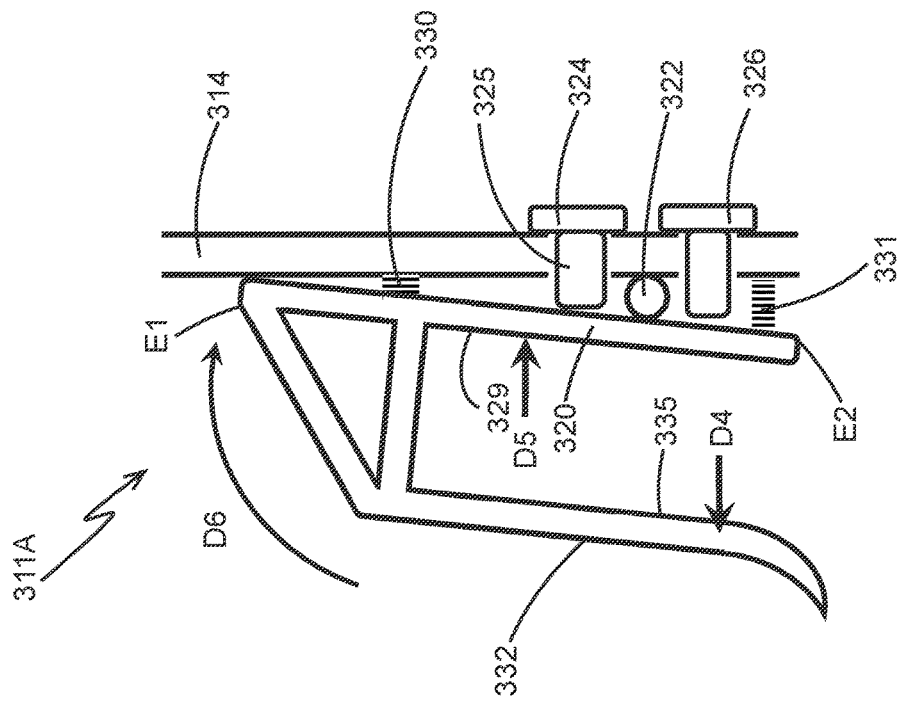
FIG. 7B is a partial sectional view of the actuator of FIG. 7A in a second activated position.
Figure 7A:
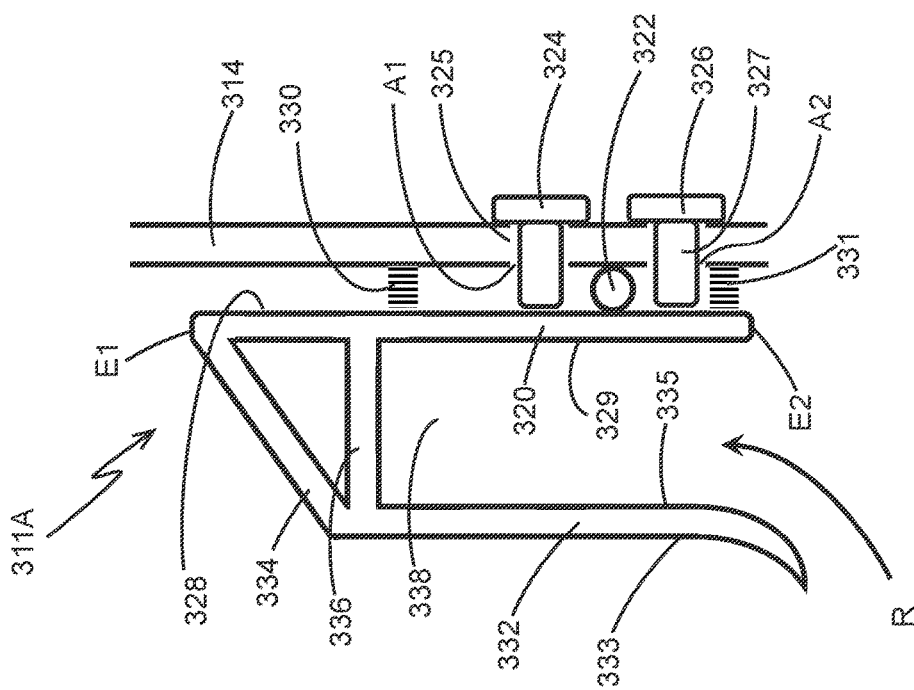
FIG. 7A is a partial sectional view of an actuator according to another embodiment in a rest position, for use with the controller of FIG. 1.

Referring now to FIGS. 7A and 7B, there is shown an alternative embodiment. In the fourth illustrated embodiment, like numerals have, where possible, been used to denote like parts, albeit with the addition of the prefix "300" to indicate that these features belong to the fourth embodiment respectively. The alternative embodiment shares many common features with the first, second and third embodiments and therefore only the differences from the embodiment illustrated in FIGS. 1 to 6B will be described in any greater detail.

FIGS. 7A and 7B illustrate a paddle lever 311A according to another embodiment of the invention. The paddle lever 311A is pivotally mounted to the controller body portion 314. The paddle lever 311A pivots or rotates about a fulcrum at a position indicated by reference 322. The fulcrum is located between the first end E1 and second end E2 of the first paddle lever 311A. Optionally, the fulcrum is located closer to the second end E2 than the first end E1. A first switch mechanism 324 is mounted in vertical registry with a portion of the paddle lever 311A. A second switch mechanism 326 is mounted in vertical registry with a portion of the first paddle lever 311A. The first and second switch mechanisms 324, 326 are mounted within the body of the controller 310.

The first and second switch mechanisms 324, 326 are mounted in close proximity to each other and are disposed on opposing sides of the fulcrum 322.

In the embodiment of FIGS. 7A and 7B the switch mechanisms 324, 326 are arranged such that a portion 325, 327 of the switch mechanism 324, 326 passes through and protrudes from an outer surface of the controller body portion 314.

The first paddle lever 311A comprises a first limb 320 and a second limb 332. The second limb 332 is coupled or mounted to the first limb 320 by a support structure. The support structure comprises one or more arms 334, 336. A first arm 334 extends between the first limb 320 and the second limb 332 so as to space the second limb 332 apart from the first limb 320. An optional second arm 336 extends between the first limb 320 and the second limb 332 and braces the second limb 332 apart from the first limb 320.

The first limb 320, second limb 332 and the support structure are arranged so as to define a gap or void R. The void R is provided between the first limb 320 and the second limb 332 and is disposed proximate the second end E2. Optionally, the void R comprises an opening at the second end E2 such that a user may slide a finger through the opening between the first and second limbs 320, 332.

The void R is configured such that a user may insert two fingers therein. A first finger may be placed in the void so as to be disposed on a first side of the fulcrum 322 and a second finger may be placed in the void so as to be disposed on a second, opposing side of the fulcrum 322.

Alternatively, the user may insert a single finger in the void R. The user may select whether to place said finger on a first side of the fulcrum 322 or on a second, opposing side of the fulcrum 322.

The paddle lever 311A may be actuated to effect activation of the first switch mechanism 324, as illustrated in FIG. 7B in two ways. The user may apply a force as indicated by direction arrow D4 to an inner surface 335 of the second limb 332 in a region between the fulcrum 322 and the second end E2 such that the paddle lever 311A rotates in a clockwise direction as indicated by direction arrow D6.

The user may apply a force as indicated by direction arrow D5 to an outer surface 329 of the first limb 320 in a region between the fulcrum 322 and the first end E1 such that the paddle lever 311A rotates in a clockwise direction as indicated by direction arrow D6.

The paddle lever 311A may be actuated to effect activation of the second switch mechanism 326 in two ways. The user may apply a force to an inner surface 335 of the second limb 332 in a region between the fulcrum 322 and the first end E1 such that the paddle lever 311A rotates in a counter-clockwise direction.

The user may apply a force to an outer surface 329 of the first limb 320 in a region between the fulcrum 322 and the second end E2 such that the paddle lever 311A rotates in a counter-clockwise direction.

It will be appreciated that the user may apply forces to each of the first and second limbs 320, 332 simultaneously in opposing directions on opposing sides of the fulcrum 322 to actuate the paddle lever 311A to effect activation of one of the first and second switch mechanisms 324, 326.

The void R of the paddle lever 311A comprises a first surface 329 and a second opposing surface 335 each of which may be engaged by a user to actuate the paddle lever 311A.

Figure 8:
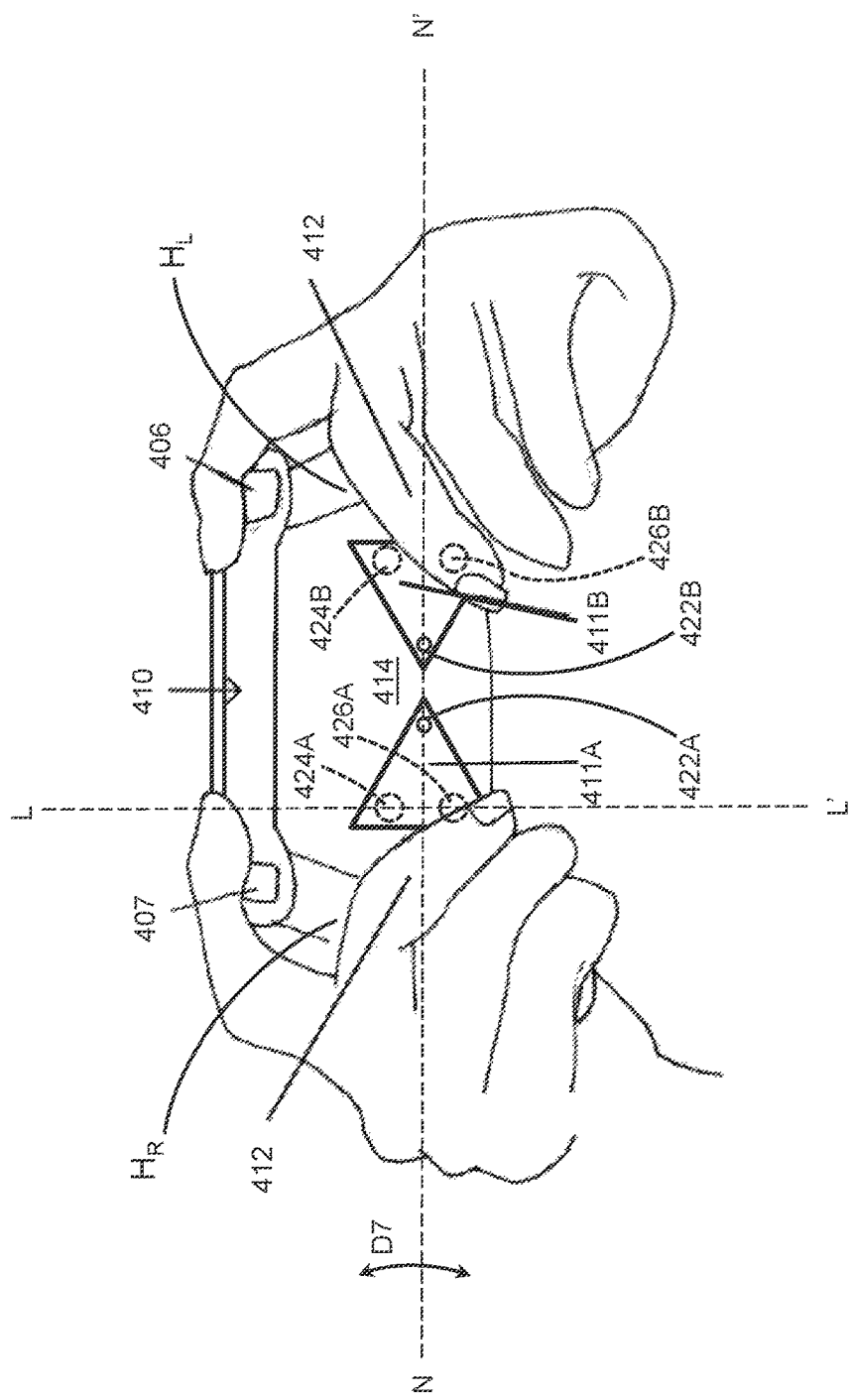
FIG. 8 is a schematic illustration from below of the rear panel of a games controller according to still yet another embodiment.
Figure 9:
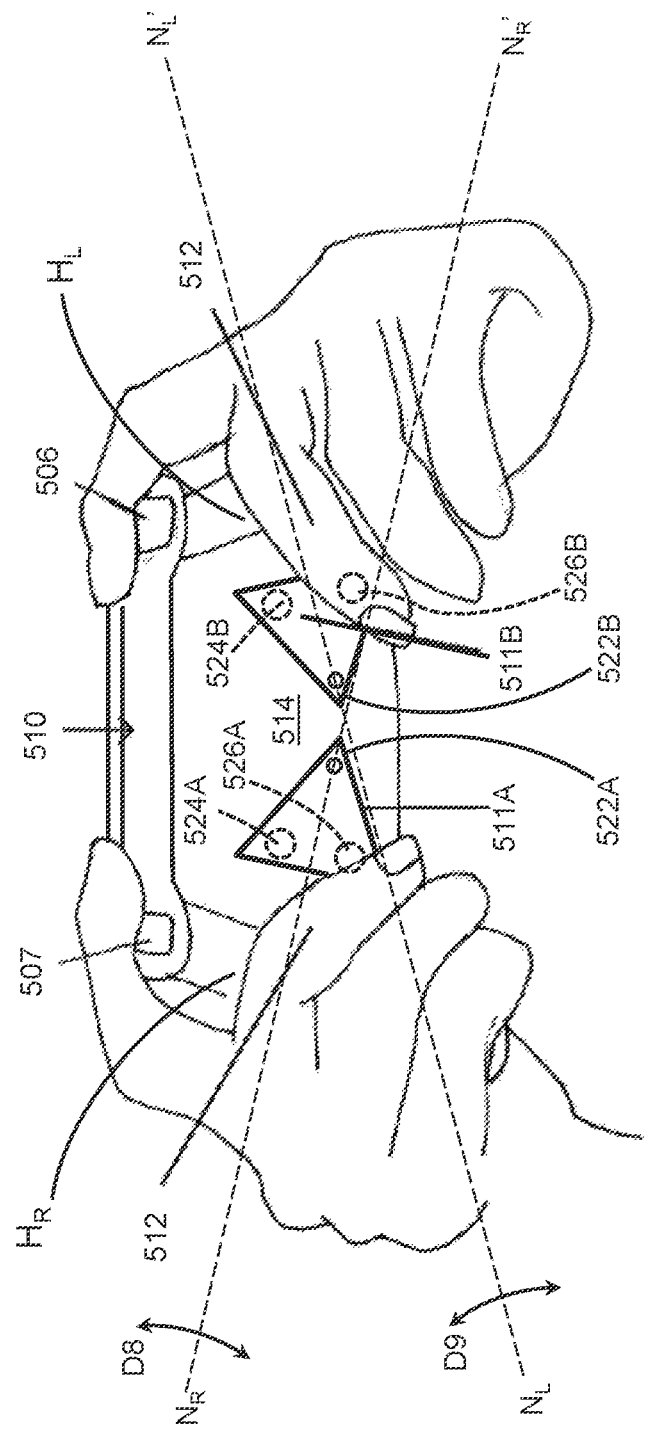
FIG. 9 is a schematic illustration from below of the rear panel of a games controller according to a further embodiment.

Referring now to FIGS. 8 and 9, there are shown alternative embodiments. In the fifth and sixth illustrated embodiments like numerals have, where possible, been used to denote like parts, albeit with the addition of the prefix "400", "500" to indicate that these features belong to the fifth and sixth embodiments respectively. The alternative embodiments share many common features with the first, second, third and fourth embodiments and therefore only the differences from the embodiment illustrated in FIGS. 1 to 7B will be described in any greater detail.

The controller 410 comprises an arrangement of game controls that are mounted on the front and top of the controller 410 as described above in relation to FIG. 1.

The rear of the games controller 410 is illustrated in FIG. 8. The controller 410 comprises two paddle levers 411A, 411B located on the rear of the controller.

The paddles 411A, 411B are mounted between a first handle portion H1 and a second handle portion H2 located on the base of the controller 410.

The first and second paddle levers 411A, 411B may be substantially triangular in shape.

The first and second paddle levers 411A, 411B may be pivotally mounted to the controller body portion 414. The first and second paddle levers 411A, 411B pivot or rotate about an axis indicated by dashed line NN'; the axis extends substantially transversely with respect to the controller 410.

In an alternative embodiment illustrated in FIG. 9 the first and second paddles 511A, 511B pivot or rotate about separate axes indicated by dashed line $N_L N_L'$ and dashed line $N_R N_R'$. The axes may be divergently arranged with respect to each other. The axes may be arranged so as to converge towards the bottom of the controller 510. In alternative embodiments the axes are arranged so as to converge towards the top of the controller 510.

Returning to the embodiment of FIG. 8 the first and second paddle levers 411A, 411B are arranged in opposition to each other such that the second paddle lever 411B is a mirror image of the first paddle lever 411A about a notional line extending from the top edge of the controller 410 to a bottom edge of the controller 410.

The first paddle lever 411A is disposed in an overlying relationship with a first switch mechanism 424A and a second switch mechanism 426A.

The first switch mechanism 424A is disposed proximate a first corner of the first paddle lever 411A and the second switch mechanism 426A is disposed proximate a second corner of the first paddle lever 411A. The fulcrum 422A is disposed proximate a third corner of the first paddle lever 411A.

The second paddle lever 411B is disposed in an overlying relationship with a third switch mechanism 424B and a fourth switch mechanism 426B. The third switch mechanism 424B is disposed proximate a first corner of the second paddle lever 411B and the fourth switch mechanism 426B is disposed proximate a second corner of the second paddle lever 411B. The fulcrum 422B is disposed proximate a third corner of the second paddle lever 411B.

Whereas in the embodiments of FIGS. 1 to 7B the fulcrum 22; 122; 222; 322 and a pair of switch mechanisms were arranged to be collinear with each other. The fulcrums 422A, 422B of the embodiment of FIG. 8 are not collinear with a respective pair of switch mechanisms 424A/426A, 424B/426B. The fulcrum 422A is inset with respective to the first and second switch mechanisms 424A, 426A. The fulcrum 422B is inset with respective to the third and fourth switch mechanisms 424B, 426B.

In some embodiments, the first and second paddle levers 411A, 411B pivot or rotate about a fulcrum at a position indicated by reference 422A, 422B respectively.

In other embodiments, the first and second paddle levers 411A, 411B may be mounted about a support disposed a position indicated by reference 422A, 422B respectively. The first and second paddle levers 411A, 411B may be configured to elastically bend or deform about the support such that the paddle levers 411A, 411B may be brought to bear against one of the respective pair of switch mechanisms which they overlie.

It is envisaged that the controllers may be coupled to a games console or computer by a wired connection or by a wireless connection device.

The actuators 11A, 111A, 211A, 311A, 411A may be removable or detachable from the controller. The actuators may be toollessly coupled to, and uncoupled from, the controller. The actuator may comprise a first part of a complementary securing mechanism for mating with a second part of a complementary securing mechanism incorporated with the controller body.

It can be appreciated that various changes may be made within the scope of the present invention. Whilst in the foregoing embodiments the actuator mechanism has been described with reference to a hand held games controller for use with a home video games console or other personal computer, in alternative embodiments the actuator mechanism may be employed with other hand held electronic devices, or example but not limited to a portable handheld games console (a single unit comprising the console, screen, speakers, and controls), a mobile telephone, tablet computer, phablet computer. The actuator mechanism may be integrated within such portable devices or may form part of an accessory apparatus such as, but not limited to, a case or caddy or other removable jacket arranged to accommodate the portable device.

It will be recognised that as used herein, directional references such as "top", "bottom", "front", "back", "end", "side", "inner", "outer", "upper" and "lower" do not limit the respective features to such orientation, but merely serve to distinguish these features from one another.

What is claimed is:

1. An apparatus for supplying user inputs to a computer program, comprising:
   a case; and
   a plurality of controls located on a front and top of the apparatus;
   the apparatus being shaped to be held in both hands of a user such that thumbs of the user are positioned to operate controls located on the front of the apparatus and index fingers of the user are positioned to operate controls located on the top of the apparatus; wherein
   the apparatus further comprises at least one first additional control located on a back of the apparatus in a position operable by a middle, ring or little finger of the user, the at least one first additional control comprising an actuator disposed in overlying relationship with a first switch mechanism and a second switch mechanism, the actuator being pivotally coupled to the apparatus such that the actuator activates the first switch mechanism when rotated in a first direction and activates the second switch mechanism when rotated in a second opposing direction,
   wherein the actuator comprises a void having opposing first and second walls, wherein the first wall provides an inner engaging surface facing towards a rear of the case for activation in the first direction and the second wall provides an outer engaging surface facing away from the rear of the case for actuation in the second direction.

2. The apparatus of claim 1 wherein the actuator is resiliently biased to return to a neutral position in which neither of the first switch mechanism and the second switch mechanism are activated.

3. The apparatus of claim 1 wherein the actuator is removably mounted to the apparatus.

4. The apparatus of claim 3 wherein the actuator comprises a first part of a complementary securing mechanism and the case comprises a second part of the complementary securing mechanism wherein the first part mates with second part to secure the actuator to the case.

5. The apparatus of claim 1 wherein the void is open at one end such that the user may insert a finger through said open end.

6. The apparatus of claim 1 wherein the void extends across opposing sides of a fulcrum.

7. The apparatus of claim 6 wherein the void is arranged such that each of the first switch mechanism and the second switch mechanism can be activated by engaging with the first wall on opposing sides of the fulcrum.

8. The apparatus of claim 6 wherein the void is arranged such that each of the first switch mechanism and the second switch mechanism can be activated by engaging with the second wall on opposing sides of the fulcrum.

9. The apparatus of claim 1 wherein a fulcrum of the actuator is collinear with the first switch mechanism and the second switch mechanism.

10. An apparatus for supplying user inputs to a computer program, comprising:
   a case; and
   a plurality of controls located on a front and top of the apparatus;
   the apparatus being shaped to be held in both hands of a user such that thumbs of the user are positioned to operate controls located on the front of the apparatus and index fingers of the user are positioned to operate controls located on the top of the apparatus; wherein
   the apparatus further comprises at least one first additional control located on a back of the apparatus in a position operable by a middle, ring or little finger of the user, the at least one first additional control comprising an actuator disposed in overlying relationship with a first switch mechanism and a second switch mechanism, the actuator being mounted to the apparatus by a support and being elastically deformable so as to activate at least one of the first switch mechanism and the second switch mechanism,
   wherein the actuator comprises a void having opposing first and second walls, wherein the first wall provides an inner engaging surface facing towards a rear of the case for activation in a first direction and the second wall provides an outer engaging surface facing away from the rear of the case for actuation in a second direction.

11. The apparatus of claim 10 wherein the actuator is removably mounted to the apparatus.

12. The apparatus of claim 11 wherein the actuator comprises a first part of a complementary securing mechanism and the case comprises a second part of the complementary securing mechanism wherein the first part mates with second part to secure the actuator to the case.

13. The apparatus of claim 10 wherein the void is open at one end such that the user may insert a finger through said open end.

14. The apparatus of claim 10 wherein a fulcrum of the actuator is collinear with the first switch mechanism and the second switch mechanism.

15. An apparatus for supplying user inputs to a computer program, comprising:
   a case; and
   a plurality of controls located on a front and top of the apparatus;
   the apparatus being shaped to be held in both hands of a user such that thumbs of the user are positioned to operate controls located on the front of the apparatus and index fingers of the user are positioned to operate controls located on the top of the apparatus; wherein
   the apparatus further comprises at least one first additional control located on a back of the apparatus in a position operable by a middle, ring or little finger of the user, the at least one first additional control comprising an actuator disposed in overlying relationship with at least one sensor, the actuator being pivotally coupled to the apparatus such that the actuator activates the at least one sensor when rotated in a first direction and activates the at least one sensor when rotated in a second opposing direction,
   wherein the actuator comprises a void having opposing first and second walls, wherein the first wall provides an inner engaging surface facing towards a rear of the case for activation in the first direction and the second wall provides an outer engaging surface facing away from the rear of the case for actuation in the second direction.

16. The apparatus of claim 1 wherein the computer program is a game program.

17. The apparatus of claim 10 wherein the computer program is a game program.

18. The apparatus of claim 15 wherein the computer program is a game program.

19. An apparatus for supplying user inputs to a computer program, comprising:
   a case; and
   a plurality of controls located on a front and top of the apparatus;
   the apparatus being shaped to be held in both hands of a user such that thumbs of the user are positioned to operate controls located on the front of the apparatus and the index fingers of the user are positioned to operate controls located on the top of the apparatus; wherein
   the apparatus further comprises at least one first additional control located on a back of the apparatus in a position operable by a middle, ring or little finger of the user, the at least one first additional control comprising an actuator disposed in overlying relationship with a first switch mechanism and a second switch mechanism, the actuator being pivotally coupled to the apparatus such that the actuator activates the first switch mechanism when rotated in a first direction and activates the second switch mechanism when rotated in a second opposing direction,
   wherein a fulcrum of the actuator is not collinear with the first switch mechanism and the second switch mechanism.

20. The apparatus of claim 19 wherein the actuator is resiliently biased to return to a neutral position in which neither of the first switch mechanism and the second switch mechanism are activated.

21. The apparatus of claim 19 wherein the actuator is removably mounted to the apparatus.

22. The apparatus of claim 21 wherein the actuator comprises a first part of a complementary securing mechanism and the case comprises a second part of the complementary securing mechanism wherein the first part mates with second part to secure the actuator to the case.

23. The apparatus of claim 19 wherein the fulcrum of the actuator is offset from a notional line defined by the first switch mechanism and the second switch mechanism.

24. The apparatus of claim 19 wherein the fulcrum of the actuator is inset from a notional line defined by the first switch mechanism and the second switch mechanism.

25. The apparatus of claim 19 wherein the computer program is a game program.

26. An apparatus for supplying user inputs to a computer program, comprising:
   a case; and
   a plurality of controls located on a front and top of the apparatus;
   the apparatus being shaped to be held in both hands of a user such that thumbs of the user are positioned to operate controls located on the front of the apparatus and index fingers of the user are positioned to operate controls located on the top of the apparatus; wherein the apparatus further comprises at least one first additional control located on a back of the apparatus in a position operable by a middle, ring or little finger of the user, the at least one first additional control comprising an actuator disposed in overlying relationship with a first switch mechanism and a second switch mechanism, the actuator being mounted to the apparatus by a support and being elastically deformable so as to activate at least one of the first switch mechanism and the second switch mechanism, wherein a mounting point of the actuator is not collinear with the first switch mechanism and the second switch mechanism.

27. The apparatus of claim 26 wherein the actuator is removably mounted to the apparatus.

28. The apparatus of claim 27 wherein the actuator comprises a first part of a complementary securing mechanism and the case comprises a second part of the complementary securing mechanism wherein the first part mates with second part to secure the actuator to the case.

29. The apparatus of claim 26 wherein the mounting point of the actuator is offset from a notional line defined by the first switch mechanism and the second switch mechanism.

30. The apparatus of claim 26 wherein the mounting point of the actuator is inset from a notional line defined by the first switch mechanism and the second switch mechanism.

31. The apparatus of claim 26 wherein the computer program is a game program.

32. An apparatus for supplying user inputs to a computer program, comprising:

a case; and a plurality of controls located on a front and top of the apparatus;

the apparatus being shaped to be held in both hands of a user such that thumbs of the user are positioned to operate controls located on the front of the apparatus and index fingers of the user are positioned to operate controls located on the top of the apparatus; wherein the apparatus further comprises at least one first additional control located on a back of the apparatus in a position operable by a middle, ring or little finger of the user, the at least one first additional control comprising an actuator disposed in overlying relationship with at least one sensor, the actuator being pivotally coupled to the apparatus such that the actuator activates the at least one sensor when rotated in a first direction and activates the at least one sensor when rotated in a second opposing direction, wherein a fulcrum of the actuator is not collinear with a first switch mechanism and a second switch mechanism.

33. The apparatus of claim 32 wherein the computer program is a game program.

* * * * *